(12) United States Patent
Huang et al.

(10) Patent No.: US 9,467,456 B2
(45) Date of Patent: Oct. 11, 2016

(54) SINGLE LOGIN AUTHENTICATION FOR USERS WITH MULTIPLE IPV4/IPV6 ADDRESSES

(71) Applicant: Dell Software Inc., Round Rock, TX (US)

(72) Inventors: Xiao Yu Huang, Shanghai (CN); Zhong Chen, San Jose, CA (US); Yi Fei Hu, Shanghai (CN); Riji Cai, Shanghai (CN)

(73) Assignee: Dell Software Inc., Round Rock, TX (US)

( * ) Notice: Subject to any disclaimer, the term of this patent is extended or adjusted under 35 U.S.C. 154(b) by 19 days.

(21) Appl. No.: 14/473,190

(22) Filed: Aug. 29, 2014

(65) Prior Publication Data

US 2016/0065551 A1 Mar. 3, 2016

(51) Int. Cl.
*H04L 29/00* (2006.01)
*H04L 29/06* (2006.01)

(52) U.S. Cl.
CPC ......... *H04L 63/102* (2013.01); *H04L 63/0815* (2013.01)

(58) Field of Classification Search
CPC combination set(s) only.
See application file for complete search history.

(56) References Cited

U.S. PATENT DOCUMENTS

| | | |
|---|---|---|
| 7,865,943 B2 | 1/2011 | Hayler et al. |
| 8,136,150 B2 | 3/2012 | Hayler et al. |
| 8,397,283 B2 | 3/2013 | Hayler et al. |
| 8,898,751 B2 * | 11/2014 | Yin .......................... G06F 21/42 455/410 |
| 2008/0077981 A1 | 3/2008 | Meyer et al. |
| 2008/0077982 A1 | 3/2008 | Hayler et al. |
| 2008/0077983 A1 | 3/2008 | Meyer et al. |
| 2009/0055912 A1* | 2/2009 | Choi ...................... G06F 21/41 726/6 |

OTHER PUBLICATIONS

Abizer; Chicken Soup for the Techie, "More information about SSO experience when authenticating via ADFS," Technet, Apr. 11, 2013. http://blogs.technet.com/b/abizerh/archive/2013/04/11/more-information-about-sso-experience-when-authenticating-via-adfs.aspx.
Abizer; Chicken Soup for the Techie, "More information about SSO experience when authenticating via ADFS," Technet, Apr. 11, 2013. http://blogs.technet.com/b/abizerh/archive/2013/04/11/more-information-about-sso- experience-when-authenticating-via-adfs.aspx.
Johnson, Chris; "Integrating Oracle Access Manager with Kerberos authentication with fallback to an HTML form", Oracle Fusion Middleware Security, Jan. 25, 2010. http://fusionsecurity.blogspot.com/2010/01/kerberos-authentication-with-multiple.html.
Marshall, James B.; UK Education Cloud Blog, "Customer Story: Achieving consistent SSO with AD FS 2.0 and Office 365 for education", Microsoft, May 18, 2012. http://blogs.msdn.com/b/ukeducloud/archive/2012/05/18/customer-story-achieving-consistent-sso-with-ad-fs-2-0-and-office-365-for-education.aspx.
Ozses, Seda; "Cross-domain communications with JSONP, Part 1: Combine JSONP and jQuery to quickly build powerful mashups", IBM, developerWorks. Feb. 24, 2009. http://www.ibm.com/developerworks/library/wa-aj-jsonp1/.

(Continued)

*Primary Examiner* — Ghazal Shehni
(74) *Attorney, Agent, or Firm* — Polsinelli LLP

(57) ABSTRACT

Disclosed in the authentication and authorization of a client device to access a plurality of resources, requiring a user of a client device to enter only one set of login information. Authentication and authorization of a client device to access a plurality of resources after an initial set of login information is received by a networked computing environment. After the initial set of login information is received, a series of steps are performed that may be entirely transparent to the user of the client device.

20 Claims, 6 Drawing Sheets

(56) References Cited

OTHER PUBLICATIONS

Stackoverflow Questions; ADFS-Windows integrated OR Forms authentication. http://stackoverflow.com/questions/11470125/adfs-windows-integrated-or-forms-authentication, Mar. 4, 2016.

Vmware Horizon Workspace 1.0 Documentation Center, Horizon Workspace Administrator's Guide > Introduction to Horizon Workspace for Administrators. http://pubs.vmware.com/horizon-workspace-10/index.jsp#com.vmware.hs-administrator.doc_10/GUID-B5E0C22D-2982-45FE-A59C-C9507B205507.html, Downloaded Mar. 4, 2016.

* cited by examiner

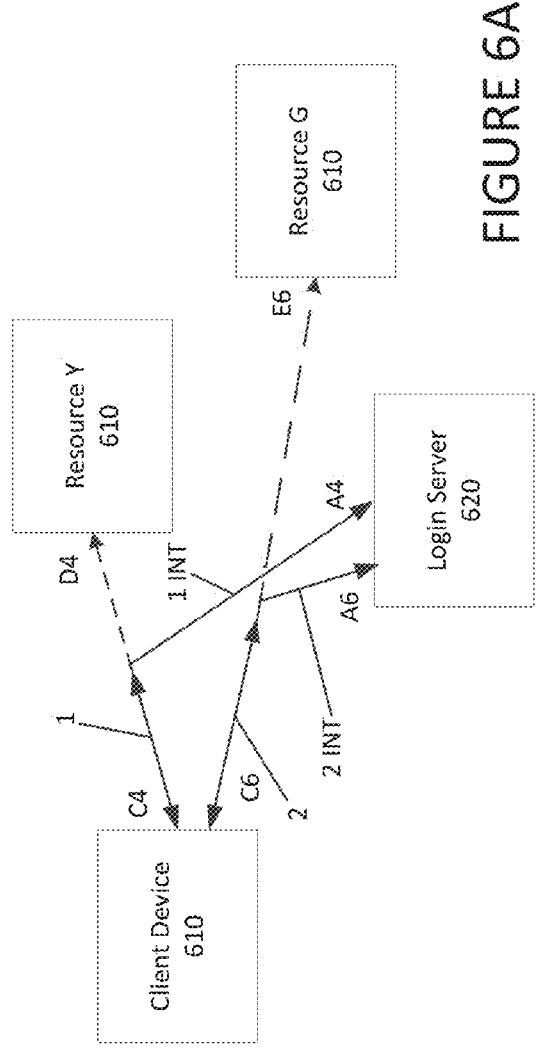
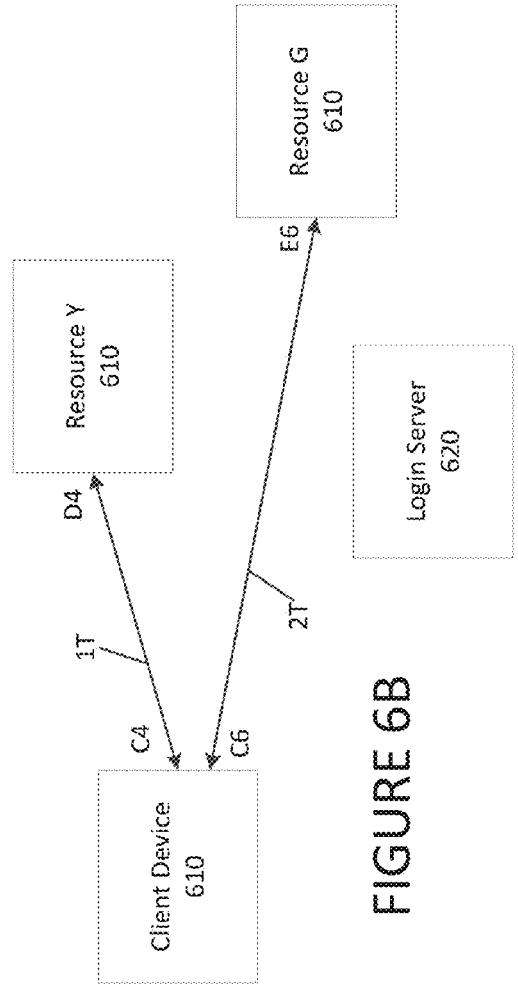

SINGLE LOGIN AUTHENTICATION FOR USERS WITH MULTIPLE IPV4/IPV6 ADDRESSES

BACKGROUND OF THE INVENTION

1. Field of the Invention

The present invention is generally related to providing access to multiple resources in a computer network by using a single login authentication instead of many. More specifically, the present invention relates to a client device gaining access to resources on a computer network that use different internet protocol addresses using only a single set of login information.

2. Description of the Related Art

Client computers seeking to access digital content through a network such as the internet or an intranet communicate with host computers using one of a plurality of standard internet communication protocols using one or more internet protocol addresses. Furthermore, these client computers may communicate with one resource using one internet protocol version using a first internet protocol address, and communicate with another resource using another internet protocol address. In certain instances, a client computer uses a single internet protocol version to access different resources using a different internet protocol address for each resource. In certain other instances, a client computer uses a first internet protocol address to access a first set of resources, and uses a second internet protocol address to access a second set of resources. The most common versions of internet communication protocols used today are IPv4 (internet protocol version 4) and IPv6 (internet protocol version 6). Most computers today have at least one IPv4 address and multiple IPv6 addresses.

Conventionally, communications from a client computer that is seeking to access a resource from a host computer must communicate with the resource using an internet protocol version and a WEB browser. Frequently, during this process, the client computer communicates with a gateway, and the gateway will redirect the client to an authentication page located in a login server. Once a user of the client computer enters a correct login username and password, the client will be authenticated to access that resource using only the internet protocol (IP) address that was used to communicate with the login server. When a user of the client computer wishes to access another resource using a different internet protocol addresses, the user must perform a second authentication process. This commonly occurs when a client computer accesses a plurality of different resources. In certain instances, the user of the client computer may have to use a separate login authentication process for each and every IP address used to access one or more resources by the client computer.

When a single client device accesses a plurality of different resources, each requiring independent authentication, a user of the client device must stop working and must engage in one or more independent authentications of their identity. Given that a single user of a client device may access many resources during a work session, the productivity of that user can be reduced significantly as the user has to perform many separate authentications during the course of a work session.

In order to increase productivity of a user of a client computer accessing a plurality of resources, a method for authenticating the identity of a client device (or its user) to a plurality of resources virtually simultaneously is needed.

BRIEF DESCRIPTION OF THE DRAWINGS

FIG. 6A depicts a client device attempting to access two different resources that require authentication before the client device may accesses the two different resources.

FIG. 6B depicts a client device communicating with two different resources after the client device has been authenticated and authorized to access those two different resources.

SUMMARY OF THE PRESENTLY CLAIMED INVENTION

The presently claimed invention authenticates and authorizes a client device to access a plurality of resources, requiring a user of a client device to enter only one set of login information. Since conventional networked computing environments require a user of a client device to provide a set of login information for each IP address used to access one or more resources by a client computer, the presently claimed invention increases the productivity of the data center.

The presently claimed invention authenticates and authorizes a client device to access a plurality of resources using a plurality of different IP address after an initial set of login information is received by a networked computing environment. After the initial set of login information is received, the presently claimed invention performs the series of steps in a manner that may be entirely transparent to a user of the client device. Steps in the presently claimed invention include transmitting login authentication information to a client device, and receiving a plurality of login authentication requests from the client device. The login authentication information transmitted to the client device includes a list of internet protocol addresses that the client device may use when generating one or more of the login authentication requests. Each individual internet protocol address in the list may use the same or a different internet protocol version as another individual internet protocol address in the list.

The method of the presently claimed invention continues when a login complete message is received from the client device, the receipt of the login complete message is followed by the transmission of a login complete page to the client device. Finally, the client device is allowed to access the authorized resources in the networked computing environment.

In certain embodiments, the optional step of transmitting response messages to the client device precedes the receiving of the login complete message. In these embodiments, each of the response messages correspond to one of the login authentication requests received.

DETAILED DESCRIPTION

Figure 1:
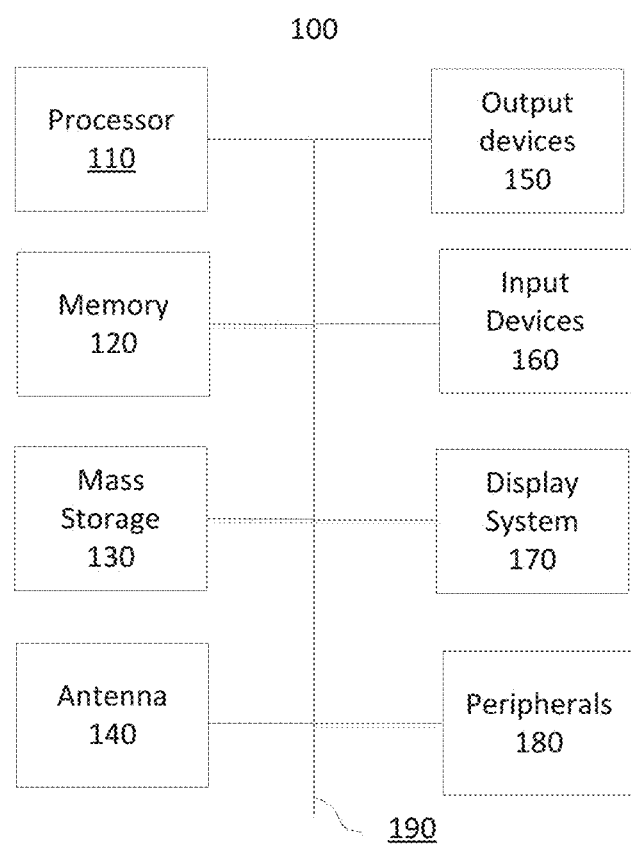
FIG. 1 illustrates a block diagram of a computing device that may be used to implement various embodiments of the present invention.

FIG. 1 is a block diagram of a device for implementing the present technology. FIG. 1 illustrates an exemplary computing system 100 that may be used to implement a computing device for use with the present technology. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, and peripheral devices 180.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive or an optical disk drive, or be a portable storage device. Mass storage device 130 can store the system software for implementing embodiments of the present invention for purposes of loading that software into main memory 120.

In certain instances mass storage 130 may include a portable storage device, such as a floppy disk, compact disk, a Digital video disc, or a USB data storage device. The system software for implementing embodiments of the present invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140 transmit a wireless signal to a cellular network and receive a wireless signal from a cellular network.

The system 100 as shown in FIG. 1 includes output devices 150 and input devices 160. Examples of suitable output devices include speakers, printers, network interfaces, and monitors. Input devices 160 may include a touch screen, microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a desktop computer, laptop computer, notebook computer, netbook computer, tablet computer, smart phone, personal data assistant (PDA), or other computer that may be suitable for use with embodiments of the present invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 2:
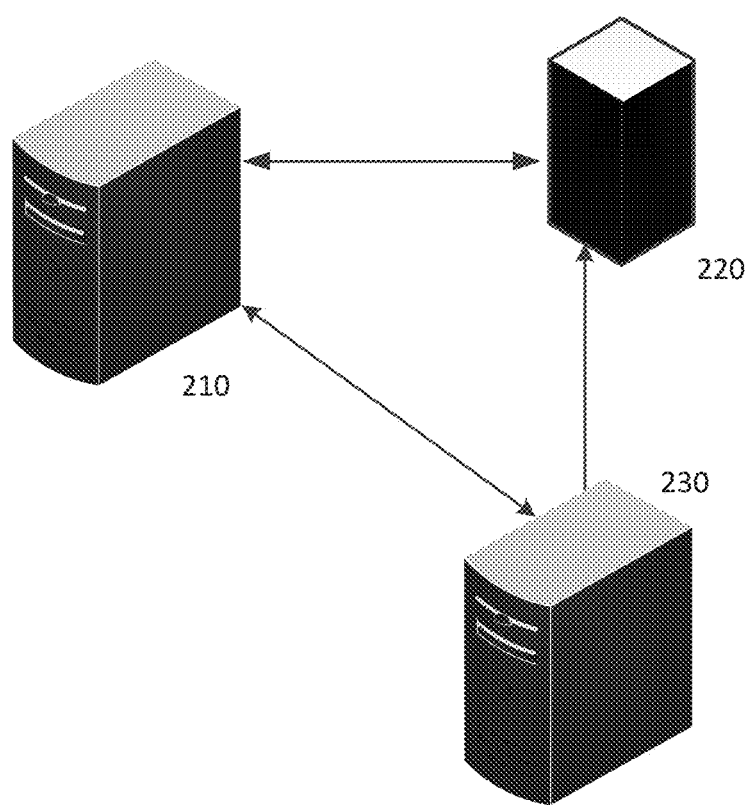
FIG. 2 illustrates a client computer in communication with a gateway and a server administrating a login function.

FIG. 2 illustrates a client computer in communication with a gateway and a server administrating a login function. FIG. 2 includes a client device 210 in communication with a gateway 220, and a login server 230. A single login authentication (SLA) process consistent with the invention is initiated after a user of a client device communicates its intent to access one or more resources located on one or more servers in a networked computing environment. The gateway 220 is a computing device that routes network traffic in a computer networking environment. At least one of the one or more servers in the networked computing environment performs the function of a login server 230. In certain instances the gateway 220 and the login server 230 are located within the same computing device. In other instances, a firewall (not depicted) may also be used in implementations of the invention. In these instances, the firewall an independent device, may be located within the same computing device as the gateway, or may be located within a computing device that performs the functions of the gateway and the login server. In yet other instances, the invention may use a plurality of other servers when performing an SLA process that is consistent with the embodiments of the present invention.

Figure 3:
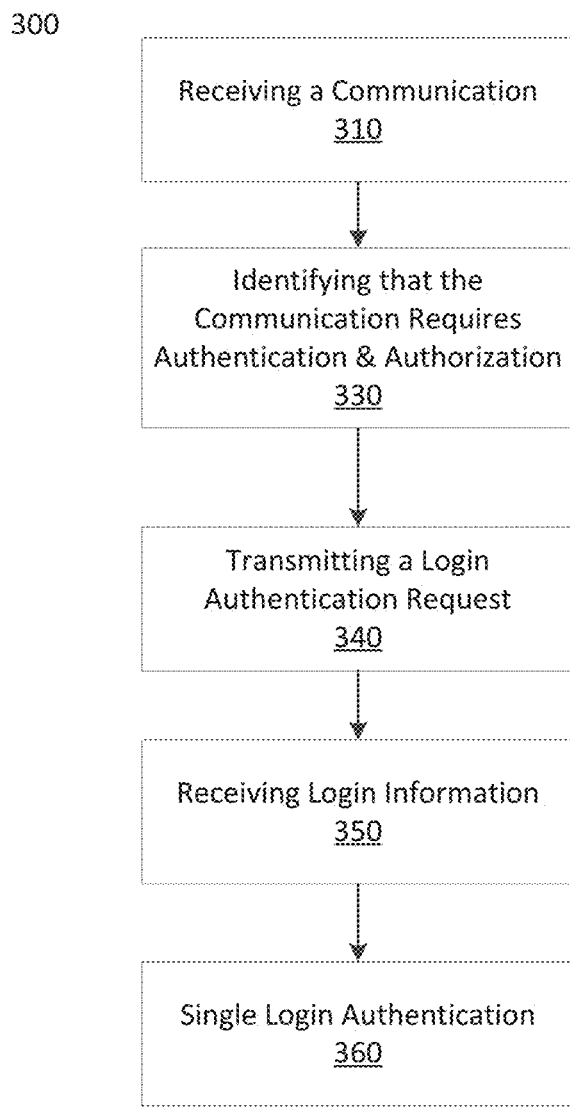
FIG. 3 is a flow chart that illustrates a series of steps prior to a step that performs the Single Login Authentication (SLA) process.

FIG. 3 is a flow chart that illustrates a series of steps prior to a step that performs the SLA process. The flow chart 300 begins with step 310 where a communication (network traffic) is received by the gateway 220 from the client device 210 through a WEB browser. In step 330 the gateway 220 identifies that this communication requires authentication and authorization prior to servicing the communication.

In certain instances, the gateway 220 will also temporarily store the communication received from the client device and send an authentication redirect message (not depicted) to the client device. The authentication redirect message (not depicted) informs the client device that the authentication and authorization functions have been redirected to the login server 230 by passing through the communication to the login server 230. In certain other instances, the gateway 220 performs the function of the login server. In these other instances, the gateway 220 will not necessarily need to redirect the authentication and authorization functions to a separate login server, yet will typically inform the client when an authentication needs to be performed.

Step 340 is a step where the login server transmits a login authentication request to the client device. After this, the login server receives login information from the client device at step 350. In certain instances the login information includes one or more of a username, a password, an identifier that uniquely identifies the client device, and a login token.

Figure 4:
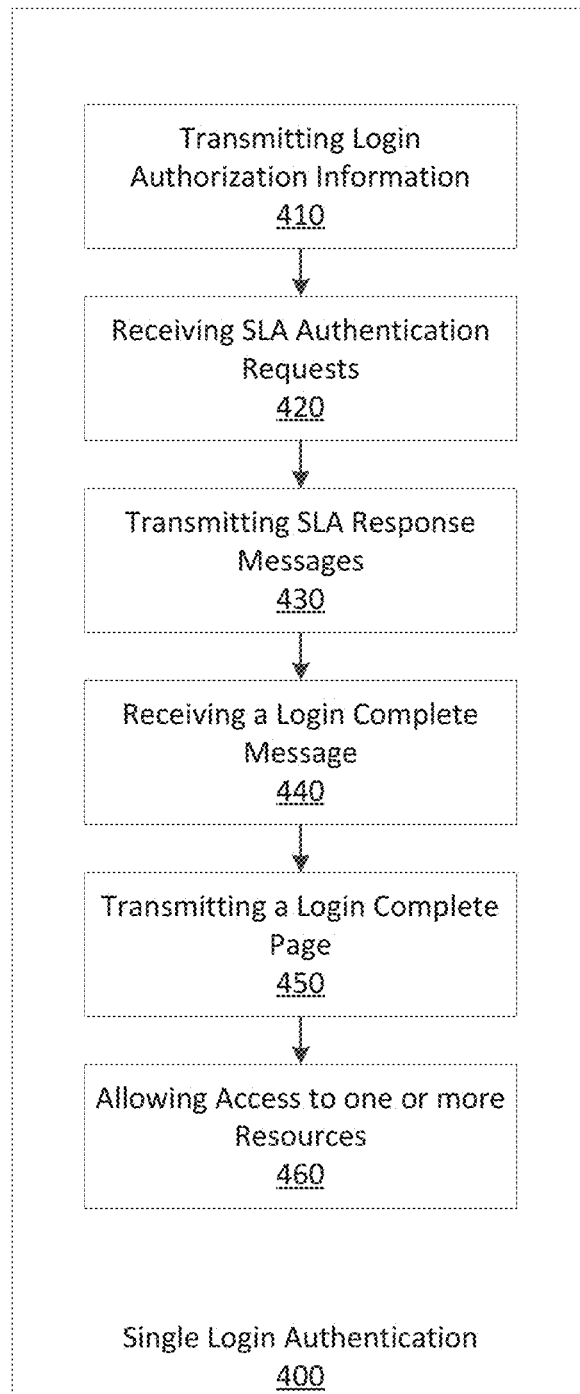
FIG. 4 depicts a flow chart of the Single Login Authentication (SLA) process.

FIG. 3 concludes with step 360 where the Single Login Authentication (SLA) process is implemented. FIG. 4 depicts an embodiment of the SLA process from the perspective of a computing device located in the networked computing environment.

In certain instances the login tokens discussed above are transmitted through electronic communications to the client device at a point in time before the client device transmits the communication. Examples of login tokens being electronically transmitted are email, secure email, and a text message. In certain other instances a login token may be included in a hardware device that is either temporarily or permanently attached to the client device. Examples of such hardware devices include a memory programmed in an electronic device, a USB thumb drive that includes the login token, or be a wireless device that is in close proximity to the client device. An example of such a wireless device is a memory communicating using the Bluetooth™ wireless standard.

This process may also include directing an initial login authentication query to a remote authorization server. This step (not depicted) is similar to step 340 of FIG. 3. The difference is that this login authentication is performed by a remote authorization server and not the login server. Here again login traffic may pass through a firewall, and be directed to the remote authorization server by the gateway.

FIG. 4 depicts a flow chart of the Single Login Authentication (SLA) process. The SLA process 400 of FIG. 4 begins with step 410 where login authorization information is transmitted to the client device. After the client device receives and processes the login authorization information, the client device transmits SLA authentication requests (SLA requests) to the login server.

At step 420, SLA requests are received by the login server. Typically a plurality of SLA requests are received asynchronously and substantially simultaneously by the login server. Since the plurality of requests are transmitted asynchronously and substantially simultaneously, they will typically be processed predominantly concurrently such that individual SLA responses (when used) correspond each individual SLA requests. Thus, when SLA response is used, the SLA responses should be available within a limited time period.

Step 430 is an optional step where SLA responses are used. Step 430 is where response messages are transmitted to the client device after the SLA requests have been received and processed. Each of these SLA response messages correspond to an individual SLA request. Since each of the plurality of SLA requests are processed substantially concurrently, the SLA responses for each of the SLA requests should be received substantially simultaneously. This is because each of the processing requests should take a similar amount of time to process. Typically, these SLA response messages will also be transmitted asynchronously to the client device.

Step 440 is where a login complete message is received from the client device. In embodiments of the invention that include step 430, the login complete message may be transmitted by the client device immediately after the SLA response messages are received by the client device. Step 450 is where a login complete page is transmitted to the client device. After step 450, the client device will be allowed access to one or more resources in step 460 using one or more IP addresses.

Typically, the client device in the presently claimed invention does not know what resources are authorized in an SLA process. In certain embodiments of the invention, an IPv4 address and an IPv6 address are both authenticated and authorized during the SLA process. In these embodiments, the IPv4 address will typically be associated with a first group of resources, and the IPv6 address will typically be associated with a second group of resources. In these embodiments, resources associated with the IPv4 address or with the IPv6 address may be accessed at a later time without an additional login sequence. At the moment when the SLA process is performed, an IP address of the client device will be authenticated and authorized, and one or more resources associated with that client IP address may accessed at a later time. In these instances only a computing device performing authentication of client devices will be aware that a particular client device may access specific resources in the computer networking environment. The presently claimed invention, thus performs multiple authentications using a single user login without the need for the client device to be aware of which authentications have been performed successfully. In instances where the client device is not aware of failed SLA requests, the client could perform separate subsequent explicit authentications to access resources associated with the failed SLA requests.

Table 1 shows examples of a set of Single Login Authentication (SLA) information that may be used in certain embodiments of the invention. In these embodiments, the SLA information transmitted to the client device in step 410 of FIG. 4 includes this information. Table 1 includes a first entry, the current client IP address. The current client IP address is an initial internet protocol address used by the client device. The table also includes a login port that identifies a port that the client device should use to send SLA requests, and a token identifier that is a label used to refer to an SLA request. Table 1 also includes a token challenge that acts as a challenge message for SLA requests. An example of a token challenge is a random number in a hexadecimal format that is used in a Challenge-Handshake Authentication Protocol (CHAP) authentication of SLA requests. Tokens used in the SLA process are SLA authentication tokens. SLA authentication tokens and login tokens are different, login tokens are used in the initial login that a user of the client device will use or reference when providing login information from the client device. In contrast, SLA authentication tokens may either be provided in the SLA information or be generated by the client device during the SLA process.

The table also includes the entry of do HTTP initiate, this entry when set directs the client device to use HTTP, a non-secure hypertext transmission protocol when transmitting SLA requests. Typically when this entry is not set, the client device will use HTTPS, a secure hypertext transmission protocol, when transmitting SLA requests. Table 1 also includes the timeout "wait sec timeout", a "next page" entry, and a "combined login address array." In certain embodiments of the invention, the wait sec timeout is a time that the client device should expect to receive SLA response messages after the client device transmits SLA requests. In certain other embodiments of the invention, the wait set timeout is a period of time that the client device will wait before transmitting the login complete message. The "next page" entry in Table 1 identifies a page that should be fetched after the SLA process has completed. Typically, the next page fetched is a login complete page.

Finally, the combined login address array of Table 1 includes a list of all internet protocol addresses associated with a port that will be used to transmit SLA requests. These internet protocol addresses will typically be addresses associated with a firewall, a gateway, a server, or a resource located in the networked computing environment. The client device uses these addresses when composing or transmitting SLA requests. Typically the client device will generate different SLA requests, one corresponding to each and every one of these internet protocol addresses.

The addresses included in the combined login address array may be referred to as server IP addresses. Each server IP address will typically identify a range of IP addresses that are accessible by the login server. The browser of the client device will select an IP address that corresponds to a particular server IP addresses when generating the SLA requests. The IP addresses selected by the browser in the client device will be referred to herein as client IP addresses. Since the server IP addresses include a range of IP addresses, and the client IP addresses are addresses selected by the client device, a server IP address will be related to, yet are not identical to the selected client IP address.

TABLE 1

Example Login Authorization Information Content

| SLA INFORMATION | DESCRIPTION |
| --- | --- |
| Current Client IP Address | Initial Client IP Address of the client device |
| Login Port | TCP Port to send SLA requests |
| Token Identifier | Number label of SLA requests |
| Token Challenge | A authentication token, or information that may be used to generate one or more authentication tokens |
| Do HTTP Initiate | When set, the HTTP protocol is enabled to transmit SLA requests. Otherwise, use HTTPS. |
| Wait SEC Timeout | Timeout that sets how long a client will wait to receive all responses to SLA requests |
| Next Page | Identifies the next page to fetch after the SLA process is complete |
| Combined Login Address Array | A list of all IP addresses associated with the current port used for SLA requests |

The SLA information page provides information that the client device uses to generate SLA requests, and may also include execution routines that the client device uses when generating those SLA requests. In certain instances, the SLA process described above occurs without the user of the client device being aware that multiple authentications are being performed. In yet other instances, the user of the client device may be informed that multiple authentications have been performed. In either case the user of the client device is freed from the laborious task of providing multiple login authentications to gain access to a plurality of resources in the network computing environment.

Figure 5:
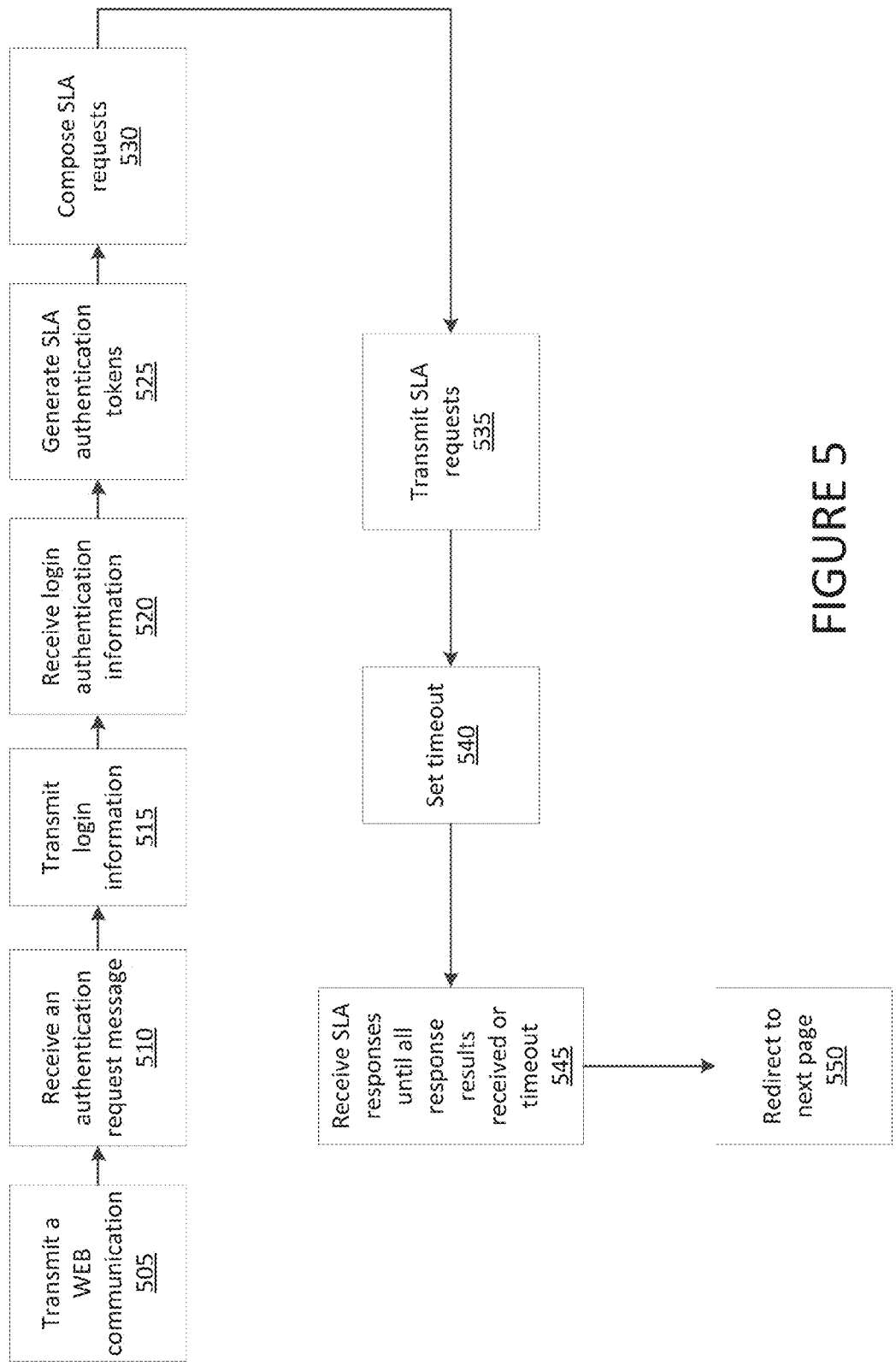
FIG. 5 is a flow chart that illustrates steps executed by a client device before and during the Single Login Authentication (SLA) process.

FIG. 5 is a flow chart that illustrates steps executed by a client device before and during the SLA process. The figure begins with step 505, where a WEB communication is transmitted from a client device wishing to gain access to resources located in a networked computing environment. This WEB communication is the same type of public communication as the communication in step 310 of FIG. 3. After transmitting the WEB communication, the client device receives an authentication request message 510 indicating that the user of the client device or the client device itself must provide login information to obtain access to resources in the networked computing environment. Once the user enters the appropriate login information the client device transmits this information 515 to the login server for authentication. As described in respect to FIG. 3, this information includes one or more of a username, a password, an identifier that uniquely identifies the client device, and a login token. In certain instances the login tokens discussed above are transmitted through electronic communications to the client device at a point in time before the client device transmits the communication.

Examples of login tokens being electronically transmitted are email, secure email, and a text message. In certain other instances a login token may be included in a hardware device that is either temporarily or permanently attached to the client device. Examples of such hardware devices include a memory programmed in an electronic device, a USB thumb drive that includes the login token, or be a wireless device that is in close proximity to the client device. An example of such a wireless device is a memory communicating using the Bluetooth™ wireless standard.

In step 520 the client device receives login authentication information, such as the login authentication information described in respect to Table 1. FIG. 5 then proceeds to step 525 where one or more SLA authentication tokens are generated. After the one or more authentication tokens are generated, the method proceeds to step 530 where the SLA authentication requests are composed. In step 535 the SLA requests are transmitted to the login server. As described above in respect to FIG. 3, the authentication requests are usually transmitted asynchronously and substantially simultaneously.

Typically, a plurality of individual SLA requests are transmitted in a manner consistent with the SLA process. When the plurality of requests are transmitted asynchronously and substantially simultaneously, they may be processed predominantly concurrently such that responses to each of the requests may be transmitted back to the client device within a limited time period.

Step 540, an optional step in FIG. 5, is where the client device sets a timeout that corresponds to a time that the client device will wait before proceeding, or that corresponds to a time within which SLA response messages should be received. Step 545 is another optional step where SLA responses are received by the client device in response to the SLA requests that were transmitted in step 535. Finally, FIG. 5 ends with step 550 where the client device is redirected to a next page.

Table 2 shows example of information that may be included in an SLA request. SLA request information typically includes an internet protocol address, a callback function parameter, a generated token, and a token identifier.

The internet protocol address in Table 2 is an IP address that relates to the SLA request. In certain instances this IP address is the current internet protocol address referenced in Table 1, and it is used as a key to associate all SLA requests received by the login server so that the login server knows which client device a set of SLA requests comes from. The callback function parameter is a parameter that relates to the type of content in the SLA request. The generated token is a token generated in step 525 of FIG. 5, it is an SLA authentication token. The token identifier is a label used to identify the SLA authentication token, in certain instances this token identifier is the token identifier described in respect to Table 1.

TABLE 2

Example SLA Request Information Request Content

| SLA REQUEST INFORMATION | DESCRIPTION |
| --- | --- |
| Internet Protocol Address | IP address relating to the SLA request |
| Callback Function Parameter (jcb) | A parameter that identifies content in the SLA request or the format of the SLA request |
| Generated Token | This is a token generated for the SLA request |
| Token Identifier | This is an identifying number of the Token |

In certain instances, the login authentication token generated is calculated in a CHAP style using a hash of the token identifier, a cached password, and the token challenge information from Table 1. An example of a method for generating an authentication token is expressed by the formula: Token=MD5 (token ID+password+token challenge info). This formula indicates that the token is calculated using an MD5 hash algorithm using the token ID, the password, and token challenge information. While one or more authentication tokens may be generated for each individual SLA request, typically only a single authentication token will be generated for each of the plurality of SLA requests used during an SLA authentication process. Using a single authentication token for a particular SLA authentication process simplifies the SLA authentication process, and allows gateways or firewalls with limited resources to be used with embodiments of the present invention.

FIG. 6A depicts a client device attempting to access two different resources that require authentication before the client device may accesses the two different resources. FIG. 6A depicts client device 610 attempting to access resource Y (yahoo.com) by transmitting communication 1. The figure depicts communication 1 being intercepted 1 INT by the login server 620. Here the login server 620 intercepts the communication and then authenticates client device 610 to access resource Y. FIG. 6A also depicts client device 610 attempting to access resource G (google.com) by transmitting communication 2. Communication 2 is intercepted 2 INT by the login server 620, and the login server 620 authenticates client device 610 to access resource G. Items C4, D4, C6, E6, A4, and A6 in the figure are peer IP addresses from related perspectives. Peer IP address C4, D4, and A4 use internet protocol version 4 (IPv4), and peer IP addresses C6, E6, and A6 use internet protocol version 6 (IPv6). Embodiments of invention may use one or more IPv4 addresses, one or more IPv6 addresses, or a mixture of IPv4 and IPv6 addresses.

In FIG. 6A, the peer address of resource Y from the perspective of client device 610 is D4. After the login server 620 intercepts 1 INT communication 1, the login server 620 communicates with the client device 610 using peer IP address C4, and client device 610 communicates with login server using peer IP address A4. Similarly, the peer address of resource G from the perspective of client device 610 is E6. After the login server intercepts 2 INT communication 2, the login server 620 communicates with the client device using peer IP address C6, and client device communicates with the login server using peer IP address A6.

FIG. 6B depicts a client device communicating with two different resources after the client device has been authenticated and authorized to access those two different resources. FIG. 6B depicts communications 1T between client device 610 and resource Y, and communications 2T between client device 610 and resource G. In this figure, client device 610 communicates with resource Y using peer IP address D4, and resource Y communicates with the client device 610 using peer IP address C4. The figure also shows client device 610 communicating with resource G using peer IP address E6, and resource Y communicating with the client device 610 using peer IP address C6.

Before the presently claimed invention, a user of client device 610 would have to enter login information twice before allowing the client device to access resource Y and resource G. The presently claimed invention authenticates client device 610 to access both resource Y and resource G after the user of client device enters login information once. In one example embodiment, this is implemented by registering peer IP address C6 (which is known from SLA request) into a user table, and associating peer address C6 with C4 when C4 is the initial peer IP address used in an initial login sequence. In another example embodiment, this is implemented by registering peer IP address C4 (which is know from SLA request) into a user table, and associating peer address C4 with C6 when C6 is the initial peer IP address used in an initial login sequence. Furthermore, the presently claimed invention may authenticate and allow a client device to access any number of resources on a computer network.

SLA requests received by the networked computing environment will be processed by a module that extracts and decodes the parameters included in the request. In certain instances, parameters such as the token ID, password, token challenge information, and/or other information may be cached in the networked computing environment.

In certain instances, SLA requests and responses will use JavaScript compatible JSONP communication formats when performing WEB communications. In certain of these instances, a JSONP communication will be blocked if the JSONP communication is considered insecure. An example of an insecure JSONP communication is a communication to another domain using JSONP over HTTP in an HTTPS page. An example of a secure JSONP communication is a communication to another domain using JSONP over HTTPS in an HTTPS page. In instances when JSONP is considered insecure the blocking of the message may be prevented by applying the HTML tag "img". When using the HTML tag "img", the originator of the communication takes responsibility for the security of the communication. Typically, in these instances, all parameters containing references to JSONP must set to "img" as well. Here parameter "jcb", referenced in Table 2, indicates the communication type. Since the "img" HTML tag is associated with harmless image communications, communications using the "img" HTML tag will be considered secure where "JSONP" communications would be considered insecure. This is particularly true when the communications use HTTP.

An example of a JSONP compatible communication is a communication that includes: IP address 192.168.168.3; a callback function parameter of jsonp139; a token 22cbc; and a token ID of 194. An example of a communication using the "img" HTML tag that may be used when a JSONP communication would be blocked, is a communication that includes: IP 192.168.168.3 address; callback function parameter img; token 9f70bb; and token ID 218.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Embodiments of the present invention may be implemented in various forms of hardware and software. Embodiments of the present invention may be controlled in part or entirely in a non-transitory computer storage medium having embodied thereon a program executable by a processor. Embodiments of the present invention may also be implemented using an Application Specific Integrated Circuit (ASIC), or other forms of electronic hardware. Thus, the invention may be implemented as a non-transitory computer readable storage medium, as a method, or in an apparatus.

While various embodiments have been described above, it should be understood that they have been presented by way of example only, and not limitation. The descriptions are not intended to limit the scope of the presently claimed invention or to limit the scope of embodiments of the present invention. The present descriptions are intended to cover alternatives, modifications, and equivalents consistent with the spirit and scope of the disclosure.

What is claimed is:

1. A method for providing a plurality of internet protocol authentications, the method comprising:
   transmitting login authentication information to a client device, wherein the login authentication information identifies at least a plurality of internet protocol (IP) addresses and a set of one or more ports that are associated with the plurality of internet protocol (IP) addresses;
   receiving a plurality of login authentication requests from the client device via at least a subset of the set of one or more ports, each login authentication request corresponding to a different internet protocol address of the plurality of internet protocol (IP) addresses;
   receiving a login complete message from the client device;
   transmitting a login complete page to the client device before allowing the client device to access one or more resources; and
   allowing the client device to access the one or more resources.

2. The method of claim 1, further comprising transmitting response messages to the client device corresponding to one or more of the plurality of login authentication requests received, wherein the response messages are transmitted before receiving the login complete message.

3. The method of claim 1, further comprising:
   validating a first login authentication request of the plurality of login authentication requests; and
   validating a second login authentication request of the plurality of login authentication requests.

4. The method of claim 1, further comprising individually validating one or more login authentication requests of the plurality of login authentication requests.

5. The method of claim 1, wherein each of the plurality of login authentication requests is received asynchronously and substantially simultaneously.

6. The method of claim 1, wherein each of the plurality of login authentication requests received include an authentication token.

7. The method of claim 6, wherein the authentication token in each of the plurality of login authentication requests is generated by the client device.

8. The method of claim 1, prior to transmitting the login authentication information, further comprising:
   receiving a communication from the client device through a WEB browser interface;
   identifying that the communication corresponds to accessing a resource that requires authentication and authorization for accessing the resource;
   transmitting an authentication request message to the client device; and
   receiving login information from the client device.

9. The method of claim 8, wherein the login information includes a login token.

10. The method of claim 8, further comprising:
    transmitting an authentication query to a remote server; and
    receiving an authentication result from the remote server.

11. A non-transitory computer readable storage medium having embodied thereon a program executable by a processor to perform a method for providing a plurality of internet protocol authentications, the method comprising:
    transmitting login authentication information to a client device, wherein the login authentication information identifies at least a plurality of internet protocol (IP) addresses and a set of one or more ports that are associated with the plurality of internet protocol (IP) addresses;
    receiving a plurality of login authentication requests from the client device via at least a subset of the set of one or more ports, each login authentication request corresponding to a different internet protocol address of the plurality of internet protocol (IP) addresses;
    receiving a login complete message from the client device;
    transmitting a login complete page to the client device before allowing the client device to access one or more resources; and
    allowing the client device to access the one or more resources.

12. The non-transitory computer-readable storage medium of claim 11, the program further executable to transmit response messages to the client device corresponding to one or more of the plurality of login authentication requests received, wherein the response messages are transmitted before receiving the login complete message.

13. The non-transitory computer readable storage medium of claim 11, wherein the program is further executable to:
    validate a first login authentication request of the plurality of login authentication requests; and
    validate a second login authentication request of the plurality of login authentication requests.

14. The non-transitory computer readable storage medium of claim 11, wherein the program is further executable to individually validate one or more login authentication requests of the plurality of login authentication requests.

15. The non-transitory computer-readable storage medium of claim 11, wherein each of the plurality of login authentication requests is received asynchronously and substantially simultaneously.

16. The non-transitory computer-readable storage medium of claim 11, wherein each of the plurality of login authentication requests received include an authentication token.

17. The non-transitory computer-readable storage medium of claim 16, wherein the authentication token in each of the plurality of login authentication requests is generated by the client device.

18. The non-transitory computer-readable storage medium of claim 11, wherein prior to transmitting the login authentication information, the program is further executable to:
    receive a communication from the client device through a WEB browser interface;

identify that the communication corresponds to accessing a resource that requires authentication and authorization for accessing the resource;

transmit an authentication request message to the client device; and receive login information from the client device.

19. The non-transitory computer-readable storage medium of claim 18, further comprising:

transmitting an authentication query to a remote server; and receiving an authentication result from the remote server.

20. A system for validating login authentication requests, the system comprising:

a communication transceiver communicatively coupled to a computer network;

a memory; and a processor coupled to the memory and to the communication transceiver, wherein execution of instructions stored in the memory by the processor:

transmits login authentication information to a client device, wherein the login authentication information identifies at least a plurality of internet protocol (IP) addresses and a set of one or more ports that are associated with the plurality of internet protocol (IP) addresses, receives a plurality of login authentication requests from the client device via at least a subset of the set of one or more ports, each login authentication request corresponding to a different internet protocol address of the plurality of internet protocol (IP) addresses, receives a login complete message from the client device, transmits a login complete page to the client device before allowing the client device to access one or more resources, and allows the client device to access the one or more resources.

* * * * *